Patented Apr. 2, 1929.

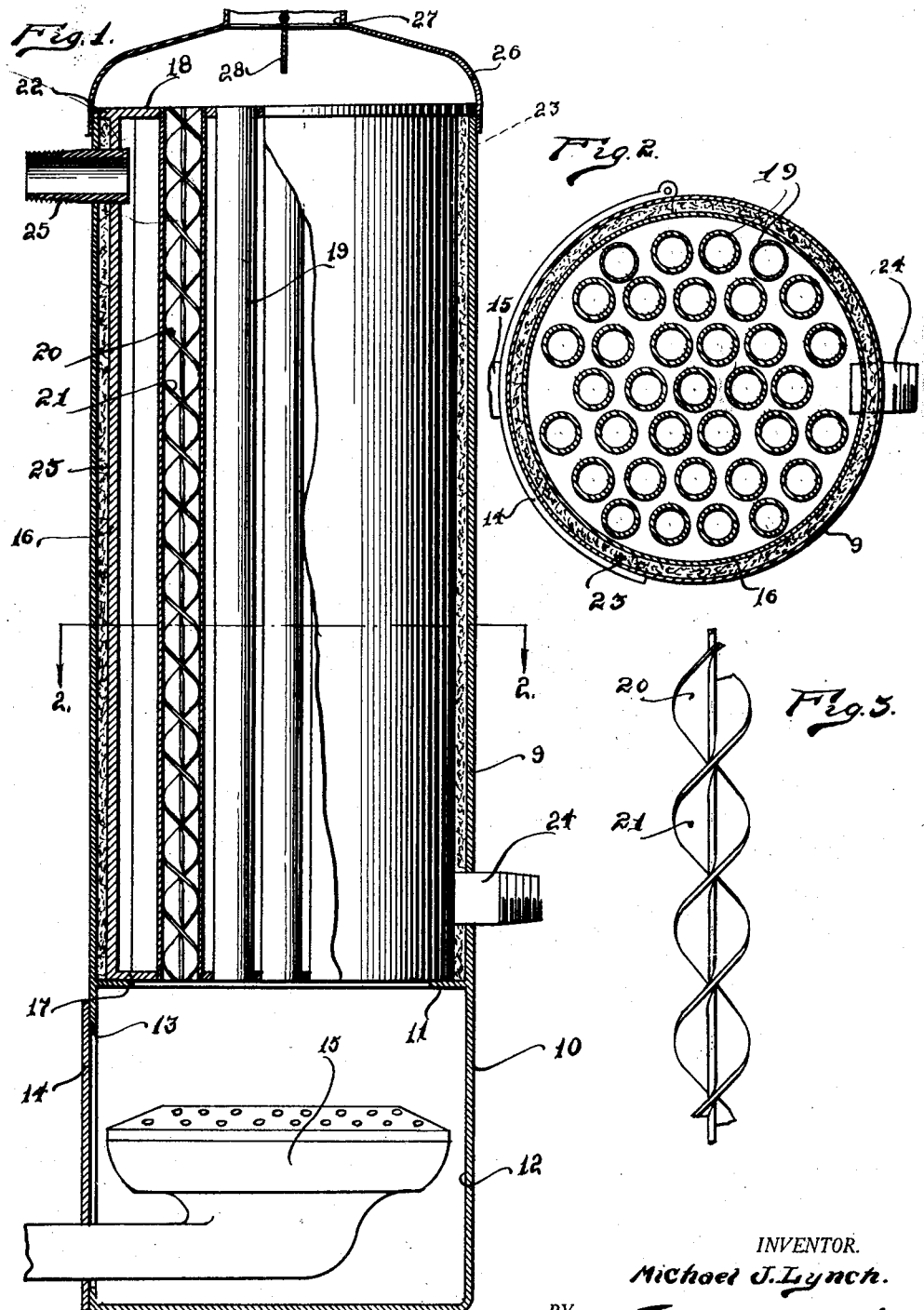

1,707,812

UNITED STATES PATENT OFFICE.

MICHAEL J. LYNCH, OF DETROIT, MICHIGAN.

HOT-WATER HEATER.

Application filed October 28, 1926. Serial No. 144,712.

My invention relates to a new and useful improvement in a water heater, and has for its object the provision of a water heater which will be economical and highly efficient in use, simple in structure, and economical of manufacture.

Another object of the invention is the provision of a water heater of this class in which circulating coils are dispensed with, and flues or fire tubes are provided so as to effect a maximum heating of the water with the fuel consumed.

Another object of the invention is the provision in the fire tubes or flues of spirally arranged retarding means or baffles for retarding the passage of the heated gases therefrom.

Other objects will appear hereinafter.

The invention consists in the combination and arrangement of parts hereinafter described and claimed.

The invention will be best understood from a reference to the accompanying drawings which form a part of this specification and in which, Fig. 1 is a central vertical sectional view of the invention with parts broken away, and parts shown in section.

Fig. 2 is a sectional view taken on substantially line 2—2 of Fig. 1.

Fig. 3 is a fragmentary perspective view of the retarding means used in the invention.

As shown in the drawings, the invention is preferably made from a number of assembled castings comprising an outer casing 9 having the lower portion 10 arranged to provide a base or support. Projecting inwardly from the wall of the casing 9 at its lower end is a flange 11, this flange projecting inwardly but a slight distance for supporting purposes and leaving the interior of the casing 9 in communication with the compartment 12 formed in the base 10. The base 10 is provided at one side with an opening 13 provided with a suitable closure or door 14 and positioned in the compartment 12 in a suitable gas burner 15. A boiler comprising the outer shell 16 is adapted for positioning on the flange 11, the flange 11 serving as a support for this boiler. End walls 17 and 18 are formed on the boiler and fire tubes or flues 19 project through the boiler being secured at opposite ends of the end walls 17 and 18. Arranged in each of the flues or tubes 19 is a pair of spirally arranged strips 20 and 21, these strips extending throughout the longitudinal length of the tubes 19 and being spirally arranged in interlocking relation as clearly seen from Fig. 1 and Fig. 3, this interlocking relation resulting from extending the strips 20 and 21 so as to be opposed to each other. The end wall 18 is provided with an outwardly projecting flange 22 which serves to engage the upper edge of the casing 9, the wall 16 being spaced from the interior of the casing 9, and this space being filled with a suitable insulating material 23, such as asbestos or the like. Projected through the casing 9 and through the wall 16 of the boiler so as to communicate with the interior thereof is an inlet nipple 24 which may be attached to a suitable source of water supply, such as the city supply. The outlet nipple 25 is projected through the wall 16 and through the casing 9 to provide outlet delivery means. A cap 26 is mounted over the upper end of the casing 9 and provided with an outlet opening or flue 27 which is controlled by a suitable damper 28.

In operation the water will be delivered to the interior of the boiler through the inlet nipple 24 and the heated gases from the burner 15 will pass upwardly through the tubes 19, the strips 20 and 21 serving to retard the passage of the gas through the tubes so as to assure the maximum heating of the tubes by the fuel consumed and to reduce to as low a temperature as possible the heated gases which escape from the flue 27.

The spirally arranged strips on account of their interlocking arrangement and spiral formation serve to retard the gases sufficient for the purposes intended, while at the same time preserving sufficient of the natural draught to insure proper combustion.

It is evident that the damper 28 may be used to also retard the passage of the gases through the flue 27.

The arrangement which I have provided is a simple and effective one for the purposes intended, and has proven in actual use to be an economical heater of this class permitting the heating of the water to a maximum degree with a minimum amount of fuel.

The arrangement of the device in castings such as illustrated is one which permits its economical manufacturing, and its easy and quick assembly in position.

While I have illustrated and described the preferred form of structure, I do not wish to limit myself to the precise form of structure shown, but desire to avail myself of such variations and modifications as may come within the scope of the appended claim.

Having thus described my invention what I claim as new and desire to secure by Letters Patent is:

A water heater of the class described, comprising: a cylindrical casing open at one end; an inwardly projecting flange adjacent the opposite end; a water container formed cylindrical insertable into said casing; a peripheral flange on one end of said container of a diameter equal to the diameter of said casing, said peripheral flange engaging the open end of said casing simultaneously with the engagement of the opposite end of said container with said inwardly projecting flange, the periphery of said container being spaced from the inner surface of said casing; and insulating material positioned in said space; and a cup shaped cap mounted on the upper end of said heater embracing said casing and said peripheral flange.

In testimony whereof I have signed the foregoing.

MICHAEL J. LYNCH.